(12) United States Patent
Popp (10) Patent No.: US 10,625,373 B2
(45) Date of Patent: Apr. 21, 2020

(54) OPTICAL ARRANGEMENTS FOR PROCESSING A WORKPIECE

(71) Applicant: TRUMPF Werkzeugmaschinen GmbH + Co. KG, Ditzingen (DE)

(72) Inventor: Andreas Popp, Markgroeningen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 276 days.

(21) Appl. No.: 15/483,056

(22) Filed: Apr. 10, 2017

(65) Prior Publication Data
US 2017/0209959 A1 Jul. 27, 2017

Related U.S. Application Data

(63) Continuation of application No. PCT/EP2014/071862, filed on Oct. 13, 2014.

(51) Int. Cl.
*B23K 26/00* (2014.01)
*B23K 26/06* (2014.01)
(Continued)

(52) U.S. Cl.
CPC ........ *B23K 26/0626* (2013.01); *B23K 26/064* (2015.10); *B23K 26/08* (2013.01);
(Continued)

(58) Field of Classification Search
CPC .. B23K 26/0626; B23K 26/064; B23K 26/08; G02B 27/0994; G02B 6/02;
(Continued)

(56) References Cited

U.S. PATENT DOCUMENTS 5,724,377 A * 3/1998 Huang .................. H01S 3/0826
356/519
6,340,806 B1 1/2002 Smart et al.
(Continued)

FOREIGN PATENT DOCUMENTS

DE 102010003750 A1 10/2011
EP 1848074 A1 10/2007
WO WO2013086227 A1 6/2013

OTHER PUBLICATIONS

Notification of Translation of International Preliminary Report on Patentablity and Written Opinion of the International Searching Authority for corresponding PCT Application No. PCT/EP2014/071862, dated Jul. 10, 2015, 13 pages.
(Continued)

*Primary Examiner* — Sang Y Paik
(74) *Attorney, Agent, or Firm* — Fish & Richardson P.C.

(57) ABSTRACT

Optical arrangements for processing a workpiece include a fiber laser arrangement for emitting laser radiation, a fiber arrangement directly coupled to the fiber laser arrangement and configured to guide the laser radiation in a direction to the workpiece to be processed, the fiber arrangement including a transport fiber having a fiber core and at least one fiber cladding surrounding the fiber core, and at least one coupling device for coupling a portion of the laser radiation guided in the fiber arrangement into at least one fiber cladding of the transport fiber. The coupling device has a spectral bandwidth of at least the same magnitude as a spectral bandwidth of the laser radiation. The fiber laser arrangement is configured to change a beam profile of the guided laser radiation to shift the spectral bandwidth of the laser radiation relative to the spectral bandwidth of the coupling device.

18 Claims, 2 Drawing Sheets

(51) Int. Cl.
*H01S 3/067* (2006.01)
*H01S 3/1055* (2006.01)
*H01S 3/105* (2006.01)
*G02B 6/42* (2006.01)
*G02B 6/02* (2006.01)
*B23K 26/064* (2014.01)
*B23K 26/08* (2014.01)
*G02B 27/09* (2006.01)

(52) U.S. Cl.
CPC ......... *G02B 6/022* (2013.01); *G02B 6/02095* (2013.01); *G02B 6/4296* (2013.01); *G02B 27/0994* (2013.01); *H01S 3/0675* (2013.01); *H01S 3/06754* (2013.01); *H01S 3/1053* (2013.01); *H01S 3/1055* (2013.01)

(58) Field of Classification Search
CPC ............ G02B 6/02033; G02B 6/02038; G02B 6/02042; G02B 6/02052; G02B 6/02057–02071; G02B 6/02076; G02B 6/0208; G02B 6/02085; G02B 6/02095; G02B 6/022; G02B 6/4296; H01S 3/067; H01S 3/0675; H01S 3/06754; H01S 3/1053; H01S 3/1055
USPC ......... 219/121.6–121.86; 385/10, 15, 27, 31, 385/37; 359/337.1, 337.21, 341.1
See application file for complete search history.

(56) References Cited

U.S. PATENT DOCUMENTS

| | | | |
|---|---|---|---|
| 6,411,755 B1* | 6/2002 | Erdogan | G02B 6/02095 385/28 |
| 6,901,087 B1 | 5/2005 | Richardson et al. | |
| 8,507,877 B2 | 8/2013 | Nicholson et al. | |
| 9,482,821 B2 | 11/2016 | Huber et al. | |
| 2002/0150336 A1* | 10/2002 | Davis | G02B 6/022 385/37 |
| 2003/0035628 A1* | 2/2003 | Putnam | G02B 6/02 385/37 |
| 2003/0185509 A1* | 10/2003 | Bailey | G02B 6/0218 385/37 |
| 2005/0207454 A1* | 9/2005 | Starodoumov | H01S 5/146 372/4 |
| 2006/0219673 A1 | 10/2006 | Varnham et al. | |
| 2009/0097807 A1 | 4/2009 | Gu et al. | |
| 2013/0299474 A1* | 11/2013 | Kashiwagi | H01S 3/067 219/121.81 |
| 2013/0301116 A1* | 11/2013 | Kliner | H01S 3/2308 359/341.3 |

OTHER PUBLICATIONS

Belanger et al., "Long-term stable device for tuning fiber Bragg gratings", Applied Optics, vol. 46, No. 16, pp. 3189-3195, Jun. 1, 2007.

Blumqvist et al., "Fundamental-mode fiber-to-fiber coupling at high-power", SPIE Photonics West Conference, San Jose, CA, 12 pages, 2009.

Castilli-Guzman et al., "Widely tunable erbium-doped fiber laser based on multimode interference effect", Optics Express, vol. 18, No. 2, pp. 591-597, Jan. 10, 2010.

Goh et al., "Over 70 nm Wideband Tuning of Fiber Bragg Gratings Using a Compressive Bending Technique", OECCC, 2 pages, Jul. 12, 2002.

Goh et al., "Greater Than 90nm Continuously Wavelength-tunable Fibre Bragg Gratings", Optical Fiber Communication Conference 2 pages, 2003.

Mohammad, Najeeb, "Analysis and Development of a Tunable Fiber Bragg Grating Filter Based on Axial Tension/Compression", University of Saskatchewan, 87 pages, Sep. 2005.

International Search Report from corresponding PCT Application No. PCT/EP2014/071862, dated Jul. 10, 2015, 4 pages.

\* cited by examiner

OPTICAL ARRANGEMENTS FOR PROCESSING A WORKPIECE

CROSS-REFERENCE TO RELATED APPLICATION

This application is a continuation of and claims priority under 35 U.S.C. § 120 to PCT Application No. PCT/EP2014/071862 filed on Oct. 13, 2014. The entire contents of this priority application are incorporated herein by reference.

TECHNICAL FIELD

The invention relates to optical arrangements for processing a workpiece and methods for processing a workpiece by such optical arrangements.

BACKGROUND

US 2006/0219673 discloses an optical arrangement or apparatus for industrially processing a material by means of a fiber laser that emits optical radiation. The apparatus is configured to generate a ring-shaped optical power distribution on the material. In one example, the apparatus has a fiber arrangement having an optical fiber and having a multimode transport fiber with a ring shaped beam guiding profile, which are connected to one another via a coupling device. The coupling device may be configured in the form of a so-called long period fiber Bragg grating (referred to as "long period grating," LPG) which couples the fundamental mode into at least one higher order mode of the transport fiber in order to generate the ring shaped power distribution. The apparatus described in US 2006/0219673 A1 makes it possible to generate a ring-shaped beam profile. However, the apparatus described therein does not make it possible to change the ring-shaped beam profile.

DE 10 2010 003 750 discloses a method and an arrangement for changing the beam profile characteristic of a laser beam by means of a multiply clad fiber. In the method, by means of a switchable apparatus, e.g., in the form of a movable wedge plate, which apparatus is arranged in the beam path upstream of the entrance end of the multiply clad fiber, the laser beam is optionally coupled either at least into the inner fiber core of the multiply clad fiber or at least into at least one outer ring core of the multiply clad fiber, in order to change the beam profile characteristic of the laser beam coupled out of the multiply clad fiber.

US 2009/0097807 describes an apparatus in which a single mode laser beam having an initial intensity distribution in the form of a Gaussian distribution, said laser beam emerging from a tunable laser, is converted into a laser beam having a different intensity distribution. The apparatus has a single mode fiber having a fiber core, in which the fundamental mode is guided, and also a fiber cladding surrounding the fiber core. A component arranged in line in the fiber couples a portion of the guided fundamental mode from the fiber core into the fiber cladding. The interaction between the propagation modes of the fiber core and of the fiber cladding converts the Gaussian distribution into the different intensity distribution at a predefined distance from the exit end of the fiber. The component arranged in the fiber may be a long period fiber Bragg grating. By changing the wavelength of the tunable laser, it is possible to set the proportion of the radiation which is coupled into a selected mode of the fiber cladding.

WO 2013/086227 discloses an apparatus for changing the beam parameter product of a laser beam with a waveguide. To change the focus diameter on the workpiece, it is possible to vary the input side divergence angle and/or the coupling in angle of the freely propagating laser beam into the waveguide. It is also possible to provide a divergence setting element on the waveguide in order to change the divergence of the laser beam propagating in the waveguide. The element may be, for example, a mechanical pressure generating device that generates micro-curvatures in the waveguide.

EP 1 848 074 discloses a laser apparatus having an active element having a double cladding, and also a multimode pump source to feed energy to the active element, for example to a fiber laser. To increase the coupling between the pump core and the signal core in a double clad fiber of the active element, it is proposed to add to a doped fiber length an LPG that increases the absorption of the radiation of the pump source at a predefined wavelength.

U.S. Pat. No. 8,507,877 describes a nonlinear optical system having a laser source and a light emission system having a single mode fiber, a mode converter and a multimode fiber. An LPG may serve as mode converter for exciting at least one of the higher order modes.

SUMMARY

The invention provides optical arrangements and methods for processing a workpiece that change a beam characteristic of laser radiation emitted by a fiber laser arrangement, in particular emitted by a high power fiber laser or by a fiber amplifier.

One aspect of the present invention features optical arrangements for processing a workpiece, including: a fiber laser arrangement configured to emit laser radiation; a fiber arrangement directly coupled to the fiber laser arrangement, e.g., by direct fiber-to-fiber coupling, and configured to guide the laser radiation from the fiber laser arrangement in a direction to the workpiece to be processed, the fiber arrangement including a transport fiber having a fiber core and one or more fiber claddings surrounding the fiber core; and at least one coupling device configured to couple a portion of the laser radiation guided in the fiber arrangement into at least one fiber cladding of the transport fiber. A spectral bandwidth of the coupling device has at least the same magnitude as a spectral bandwidth of the laser radiation emitted by the fiber laser arrangement. The fiber laser arrangement is configured to change a beam profile of the laser radiation guided in the direction of the workpiece to be processed by shifting the spectral bandwidth of the laser radiation relative to the spectral bandwidth of the coupling device.

A fiber laser arrangement within the meaning of the present application can be a laser arrangement, which includes either a resonator in the form of a fiber laser (without free space propagation) or a resonator (with or without free space propagation), as a seed laser, and at least one fiber amplifier (without free space propagation). To shift the spectral bandwidth of the laser radiation emitted by the fiber laser arrangement, either the resonator (in the case of the fiber laser) or the seed laser assigned to the fiber amplifier can be tuned, e.g., changed in terms of its laser wavelength. The seed laser can be monolithically connected to the fiber amplifier, e.g., be directly fiber-to-fiber coupled to the fiber amplifier, but this is not required. What is important in the optical arrangement as described herein is a direct fiber optic coupling between the active fiber of the fiber laser resonator or of the fiber amplifier and the transport fiber for the high power laser beam.

The optical arrangement as described herein can be constructed monolithically for the high power laser beam, that is to say, the laser radiation is guided from the fiber laser resonator or from the fiber amplifier via the fiber arrangement without free space propagation to the exit end of the transport fiber. It is only at the exit end of the transport fiber that the laser radiation is typically focused in free space propagation by means of a focusing optical unit on the workpiece to be processed. A coupling out of the laser beam from the fiber laser resonator, the fiber amplifier or a fiber of the fiber arrangement and a renewed coupling into a transport fiber of the fiber arrangement for the purpose of changing the beam profile of the laser beam would result in a loss of robustness of the monolithic construction. Moreover, in the case of fiber lasers that emit high laser powers, e.g., more than 200 W in the fundamental mode, a coupling of the freely propagating laser beam into a fiber is problematic, because the entrance end of the fiber and/or plugs or couplers provided there could be damaged on account of high coupling losses.

Therefore, it is proposed to carry out the change of the beam profile of a high power fiber laser or of a fiber amplifier without coupling out the laser radiation from the fully monolithic beam guidance in the fiber arrangement. For this purpose, a coupling device having a spectral bandwidth with a magnitude at least equal to, or greater than, that of the spectral bandwidth of the laser radiation emitted by the fiber laser arrangement, is used. If the spectral bandwidth of the fiber laser arrangement lies within the spectral bandwidth of the coupling device, the laser radiation generated by the fiber laser arrangement can be coupled substantially completely into the fiber cladding. By shifting the spectral bandwidth or the laser wavelength at which the fiber laser arrangement emits relative to the spectral bandwidth of the coupling device, it is possible to change the beam profile of the laser radiation coupled out from the transport fiber, because the proportion of the laser radiation that is coupled into the fiber cladding changes.

In particular, the fiber laser arrangement can be configured to shift the entire spectral bandwidth of the laser radiation generated by the fiber laser arrangement to an extent such that the entire spectral bandwidth of the laser radiation no longer overlaps the spectral bandwidth of the coupling device. In this case, the laser radiation is guided only in the fiber core of the transport fiber, because laser radiation is practically no longer coupled into the at least one fiber cladding.

As is generally customary, within the meaning of this application the spectral bandwidth is understood to be the full width at half maximum (FWHM) of a spectral distribution, which is also referred to as FWHM value. A shift of the spectral bandwidth thus denotes a shift of the central laser wavelength.

The change of the beam profile characteristic in the manner described herein is advantageous for the high power laser processing of workpieces, in particular for laser cutting, since the laser power during the processing of thin workpieces can be coupled into the fiber core of the transport fiber, which enables a high productivity, while during the processing of thick workpieces the laser power can be coupled into the at least one fiber cladding, which enables a high quality during the workpiece processing of thick workpieces even at high feeding speeds.

In some implementations, the coupling device forms a part of the fiber arrangement, e.g., formed in a fiber of the fiber arrangement. By way of example, a long period grating may be used for the coupling of laser radiation from the fiber core into at least one fiber cladding. The long period grating involves a periodic refractive index modification in the fiber core of a fiber that has a defined grating period. The periodic index modification leads to a resonant coupling of a mode guided in the fiber core into one or a plurality of modes guided in the fiber cladding if the resonance conditions are met. On account of the resonance, the coupling and thus that proportion of the laser radiation coupled from the core into the fiber cladding are dependent on the wavelength of the laser radiation.

In the case of a resonance wavelength resulting from the grating period and from the effective refractive indices of the fiber core and of the fiber cladding, the laser power of the mode guided in the fiber core can be practically and almost completely coupled into the mode guided in the cladding. The spectral properties of the long period grating can be influenced in a targeted manner by the variation of the number of refractive index increases, the spacing thereof and also by the level of the index modification.

In the case of long period gratings, the modes involved have the same direction of propagation, which is advantageous for the present application. In the case of a long-period grating based on Bragg reflection, the resonance wavelength forms a center wavelength of a comparatively small spectral bandwidth. In the case of an ideal long-period grating (LPG), upon the Bragg reflection a longitudinal mode is transmitted into the fiber cladding. A single long-period grating is therefore not sufficient to generate a spectral bandwidth that is greater than the spectral bandwidth of the fiber laser arrangement of at least 0.1 nm. To generate a sufficiently large spectral bandwidth, by way of example a plurality of long-period gratings having different grating constants can be written one after another into the transport fiber or into a fiber adapter of the fiber arrangement.

In some embodiments, the coupling device is configured as a chirped long-period grating. A chirped long-period grating likewise involves a modification of the refractive index in the fiber core in which the grating period of the index variation changes in the longitudinal direction of the grating (and generally increases or decreases continuously). Chirped long-period gratings have a spectral distribution whose spectral bandwidth is typically considerably greater than in the case of conventional long-period gratings. The chirped long-period grating can be written into the fiber core of the transport fiber, but it is also possible to write the long-period grating into a fiber adapter between the transport fiber and the fiber laser arrangement. In the first case, the fiber arrangement may, if appropriate, includes only the transport fiber.

In a particular example, the chirped long-period grating has a spectral bandwidth of at least 0.3 nm, preferably of at least 1.5 nm. With chirped long-period gratings it is possible to generate spectral bandwidths, e.g., 1 nm, 2 nm, 3 nm, or more, which can be at least the same magnitude as the spectral bandwidth of the laser radiation generated by the fiber laser arrangement.

In a particular example, the fiber laser arrangement is configured for generating laser radiation having a spectral bandwidth of at least 0.1 nm, preferably of at least 1 nm. Typically, the spectral bandwidth of the laser radiation increases as the power of the laser radiation generated by the fiber laser arrangement increases.

In one embodiment, the fiber laser arrangement has a fiber laser resonator having an active fiber, said resonator being formed between a first fiber Bragg grating and a second fiber Bragg grating. The active fiber, to put it more precisely, the fiber core of the active fiber, is typically doped with a laser active material, for example with ytterbium, thulium, or with erbium. The two fiber Bragg gratings are typically written into the fiber core of a photosensitive fiber (co-doped with germanium) spliced onto the laser active fiber and thereby delimit the resonator. A manufacturing method in which the refractive index increase is introduced directly by means of ultra-short pulse lasers makes it possible alternatively to write the FBG directly into the laser active fiber. One of the two fiber Bragg gratings forms an end mirror of the resonator and therefore transmits practically no laser radiation excited in the resonator, while the other fiber Bragg grating serves as a coupling out mirror in order to couple out the laser radiation from the resonator and to couple said laser radiation into the fiber arrangement or for example into an amplifier section of the fiber laser.

In another embodiment, the spectral bandwidth of the first fiber Bragg grating has a magnitude at least 1.5 times, preferably at least double, that of a spectral bandwidth of the second fiber Bragg grating. The fiber Bragg grating having the smaller bandwidth may be the fiber Bragg grating at which the laser radiation is coupled out, but it is also possible for the fiber Bragg grating serving as an end mirror to have the smaller bandwidth. The smaller spectral bandwidth of the two fiber Bragg gratings corresponds to the spectral bandwidth of the laser radiation coupled out from the fiber laser resonator. The resonator of a fiber laser can be also referred to as an oscillator, for which reason the designation fiber laser oscillator is also used hereinafter for the resonator of the fiber laser. The (larger) spectral bandwidth of the first fiber Bragg grating may be for example approximately 1 to 2 nm or more, e.g., approximately 3 or 4 nm. The smaller bandwidth of the second fiber Bragg grating may be for example in a range of between approximately 0.5 nm and 3 nm.

In another embodiment, the optical arrangement has an actuator for acting on the second fiber Bragg grating for spectrally shifting the spectral bandwidth of the reflectivity of the second fiber Bragg grating relative to the spectral bandwidth of the reflectivity of the first fiber Bragg grating. By shifting the spectral bandwidth of the second fiber Bragg grating relative to the spectral bandwidth of the first fiber Bragg grating, it is possible to tune, e.g., shift, the laser wavelength emitted by the fiber laser oscillator within the spectral bandwidth of the first fiber Bragg grating. The spectral bandwidth of the first fiber Bragg grating can be chosen with a sufficient magnitude to enable a shift of the spectral bandwidth of the fiber laser which is large enough to be able to shift the spectral bandwidth or the center wavelength of the fiber laser relative to the spectral bandwidth of the coupling device to an extent such that they no longer overlap.

In further embodiments, the actuator is configured to generate a tensile stress and/or a compressive stress on the second fiber Bragg grating. By applying a tensile stress and/or a compressive stress to the second fiber Bragg grating, it is possible to shift the spectral bandwidth of the second fiber Bragg grating reversibly (e.g., practically without hysteresis) and to spectrally tune said fiber Bragg grating. The actuator may be configured for example as a piezo-actuator. The actuator may for example increase or decrease the distance between two fiber holders between which a fiber section of the active fiber is held, the fiber Bragg grating being formed in said fiber section.

As an alternative to the above described spectral tuning of fiber Bragg gratings, it is possible to tune the spectral bandwidth or the center wavelength of the fiber laser in a different way, for example, as described in the article "Widely tunable erbium-doped fiber laser based on multimode interference effect", A. Castillo-Guzman et al., Optics Express, Vol. 18, Issue 2, pages 591-597 (2010), in which an erbium doped all fiber laser is tuned by utilizing multimode interference effects in a ring-shaped resonator.

In further embodiments, the fiber laser arrangement includes one or a plurality of fiber amplifiers for amplifying the laser radiation generated in a resonator. In this embodiment, the fiber laser arrangement has a resonator (seed laser) and a fiber amplifier (so-called Master Oscillator Power Amplifier (MOPA) arrangement). If the oscillator or seed laser is configured as a fiber laser oscillator, the laser wavelength of the seed laser can be tuned as described in the previous sections. The connection between the seed laser and the fiber amplifier is preferably likewise monolithic in this case, that is to say, that a direct fiber optic coupling is effected without free space guidance of the laser beam. The seed laser or resonator may alternatively also be embodied as a diode laser, a disk laser or a rod laser. This laser can be spectrally tuned by an optical element in free space, e.g., by a grating, and the laser beam thus tuned can subsequently be coupled into the fiber amplifier.

In a further embodiment, the resonator and/or the fiber amplifier of the fiber laser arrangement have/has an active fiber in the form of a multimode fiber or a large mode area fiber. So called "large mode area fibers" have a diameter of the fiber core of typically between 20 µm and 50 µm. Such fibers are suitable for use at high laser power since the threshold powers for the occurrence of nonlinear effects are significantly higher than in the case of single mode fibers. A large mode area fiber can guide both the transverse fundamental mode and a few transverse modes. Moreover, on account of the larger core diameter and the lower intensity associated therewith, the optical destruction threshold is shifted significantly to higher powers than is the case for fibers having a smaller fiber core diameter (so called single mode fibers).

Multimode fibers typically have fiber core diameters of more than 30 µm. In addition, multimode fibers generally have a high numerical aperture, as a result of which the laser radiation can be guided robustly even in the case of severe bending and high laser powers can be transmitted. Both with the use of large mode area fibers and with the use of multimode fibers, for the complete coupling of the laser radiation from the fiber core into the fiber cladding, the coupling device can be configured to transmit more than one mode into the fiber cladding, for which purpose a narrow-band long-period grating is not sufficient, since the latter is typically only suitable for coupling one mode from the fiber core into the cladding. When using an active fiber in the form of a large mode area fiber or a multimode fiber, the fibers of the fiber arrangement can be likewise configured as large mode area fibers or as multimode fibers to transport the laser radiation generated by the fiber laser oscillator or the fiber amplifier in the direction of the workpiece.

In further embodiments, the fiber arrangement has a transport fiber having a fiber core and having more than one fiber cladding surrounding the fiber core, and there is provided in each case a coupling device for coupling the laser radiation from the fiber core into respectively one of the fiber claddings. By providing a plurality of coupling devices, when shifting the spectral bandwidth of the laser radiation it is possible for the power of the laser to be coupled into the respective fiber claddings or distributed among the individual fiber claddings in a targeted manner.

In one development of this embodiment, the spectral bandwidths of the coupling devices do not overlap. In this case, by means of a suitable shift of the spectral bandwidth, the laser radiation can be coupled in a targeted manner only into one fiber cladding to generate a desired beam profile at the workpiece.

Another aspect of the invention features methods of processing a workpiece by an optical arrangement configured as described herein, the method including setting a beam profile of a laser radiation guided in a direction of the workpiece to be processed by shifting a spectral bandwidth of the laser radiation generated by the fiber laser arrangement relative to a spectral bandwidth of the coupling device. As described herein, it is expedient, during or before the laser processing of the workpiece, to set a beam profile that is optimized for processing (e.g., cutting or welding) of the workpiece. By way of example, the use of a beam profile that can be realized by the substantially complete coupling of the laser radiation into at least one fiber cladding of the transport fiber has proved to be advantageous for the processing of comparatively thick workpieces. The use of a beam profile generated during the guidance of the laser radiation in the fiber core of the transport fiber, e.g., without coupling into the fiber cladding, has proved to be advantageous during the processing of comparatively thin workpieces.

A further aspect of the invention features methods of processing a workpiece by an optical arrangement configured as described herein. The methods include: guiding laser radiation generated from a laser arrangement in a direction of the workpiece to be processed by a fiber arrangement directly coupled to the laser arrangement, the fiber arrangement comprising a transport fiber having a fiber core and one or more fiber claddings surrounding the fiber core; coupling, by at least one coupling device, a portion of the laser radiation guided in the fiber arrangement into at least one fiber cladding of the transport fiber; and changing a beam profile of the laser radiation guided in the direction of the workpiece to be processed by shifting a spectral bandwidth of the laser radiation relative to a spectral bandwidth of the coupling device, wherein the spectral bandwidth of the coupling device has at least the same magnitude as the spectral bandwidth of the laser radiation.

In some implementations, the laser arrangement includes a resonator formed between a first fiber Bragg grating and a second fiber Bragg grating. Shifting the spectral bandwidth of the laser radiation relative to the spectral bandwidth of the coupling device can include spectrally shifting a bandwidth of a reflectivity of the second fiber Bragg grating relative to a bandwidth of a reflectivity of the first fiber Bragg grating. In some examples, spectrally shifting the bandwidth of the reflectivity of the second fiber Bragg grating relative to the bandwidth of the reflectivity of the first fiber Bragg grating includes generating at least one of a tensile stress or a compressive stress on the second fiber Bragg grating.

Coupling the portion of the laser radiation guided in the fiber arrangement into at least one fiber cladding of the transport fiber can include coupling, by each of a plurality of coupling devices, the laser radiation from the fiber core into a respective one of the fiber claddings. There is no spectral overlap among spectral bandwidths of the coupling devices.

The methods can further include amplifying the laser radiation generated in a resonator by one or more fiber amplifiers in the laser arrangement. The laser arrangement can include an active fiber comprising a multimode fiber or a large mode area fiber.

In some implementations, the laser arrangement includes a resonator formed between a highly reflective mirror and a blazed grating. Shifting the spectral bandwidth of the laser radiation can include changing an orientation of the blazed grating relative to the laser radiation.

Further advantages of the invention are evident from the description and the drawing. Likewise, the features mentioned above and those presented below can be used in each case by themselves or as a plurality in any desired combinations. The embodiments shown and described should not be understood to be an exhaustive enumeration, but rather are of exemplary character for outlining the invention.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
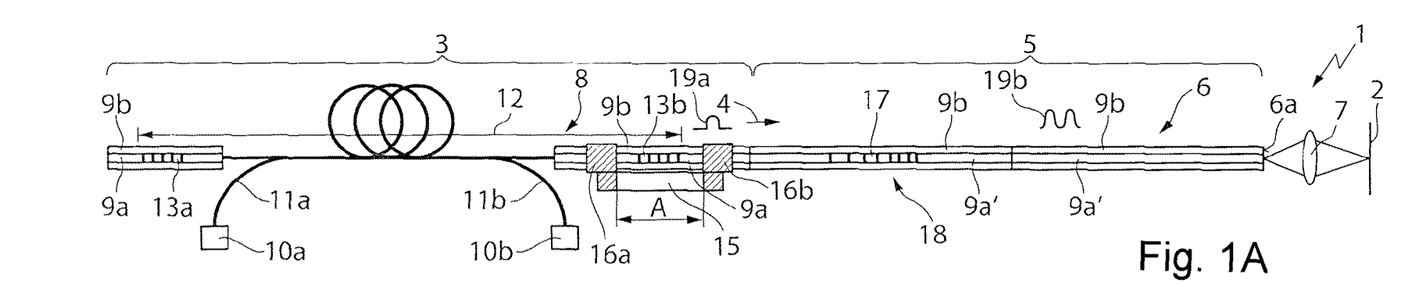
FIGS. 1A, 1B, and 1C show schematic illustrations of first, second, and third examples of optical arrangements as described herein for processing a workpiece, which optical arrangements have a fiber laser arrangement and a fiber arrangement.
Figure 1B:
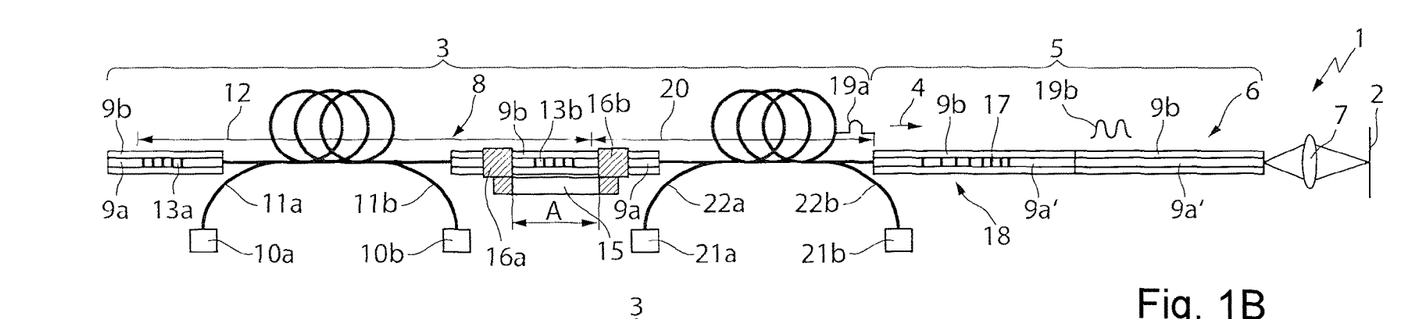
Figure 1C:
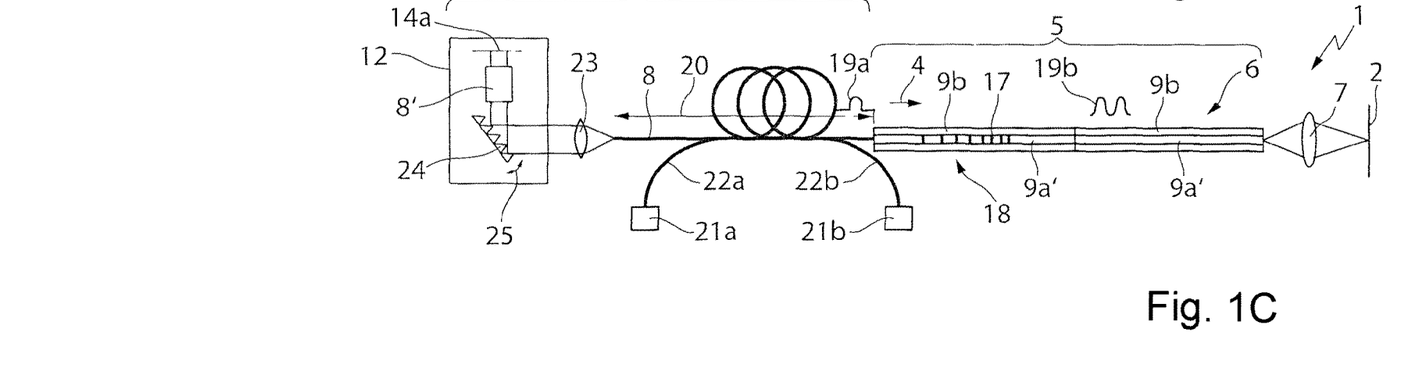

FIGS. 1A, 1B, and 1C each show an example of a construction of an optical arrangement 1 for processing a plate shaped workpiece 2, for example a metal sheet. The optical arrangement has a fiber laser arrangement 3 for emitting laser radiation 4 and a fiber arrangement 5. In the example shown, the fiber laser arrangement 3 includes a fiber laser oscillator (or fiber laser resonator) 12, which generates the emitted laser radiation 4. The fiber arrangement 5 is directly (monolithically) coupled (e.g., fiber-to-fiber) to the fiber laser arrangement 3, to put it more precisely, to the fiber laser oscillator 12. The fiber arrangement 5 has a transport fiber 6 having a length—which is comparatively long in the example shown—of usually significantly more than 2 m, to guide the laser radiation 4 from the fiber laser arrangement 3 in the direction of the workpiece 2. The combination of fiber laser arrangement 3 and fiber arrangement 5 is configured in a fully monolithic fashion, that is to say, that the fibers of the fiber laser oscillator 12 and of the fiber arrangement 5 are connected to one another, e.g., by splicing, and that the laser radiation 4 emitted by the fiber laser arrangement 3 is fiber guided and leaves the fiber arrangement 5 only at the exit end 6a of the transport fiber 6. At the exit end 6a of the transport fiber 6, the laser radiation 4 emerges from the fiber arrangement 5 and impinges on a focusing device 7, for example, in the form of a lens, which focuses the freely propagating laser radiation 4 onto the workpiece 2.

The optical arrangement 1 may form, in particular, a part of a laser processing machine (not illustrated in more specific detail) for the laser processing of workpieces 2. The transport fiber 6 may serve for guiding the laser radiation 4 from the fiber laser arrangement 3, to put it more precisely from the fiber laser oscillator 12, which serves as a beam source of the laser processing machine, to a laser processing head, in which the focusing optical unit 7 is accommodated and which is moved relative to the workpiece 2 in order to process the latter.

The fiber laser oscillator 12 of the fiber laser arrangement 3, as shown in FIG. 1A and FIG. 1B, has an active fiber 8, which is configured as a large mode area fiber and which has a fiber core 9a and a fiber cladding 9b surrounding the fiber core 9a in a ring shaped manner. In the example shown, the fiber core 9a has a diameter dK of approximately 20 μm. The diameter of the cladding 9b of the active fiber 8 is 400 μm. In the example shown, the numerical aperture NA of the fiber core 9a is approximately 0.06 and the numerical aperture of the cladding 9b is approximately 0.46. From these parameters, the so-called normalized frequency V (V parameter) of the active fiber 8 can be calculated as follows: $V=2\pi(dK/2) NA$, wherein $\lambda$ denotes the wavelength of the laser radiation 4 generated in the active fiber 8.

Under the assumption—fulfilled here—that the active fiber 8 is a step index fiber, the normalized frequency V in accordance with the formula below represents an (approximate) measure of the number of modes M guided in the active fiber 8: $M \approx V^2/2$.

For V=2.405, it follows from the formula above that only one mode (per polarization direction) can be guided. In the example shown, the normalized frequency of the active fiber 8 at a wavelength $\lambda$ of 1065 nm is approximately 4.5, that is to say, approximately ten transverse modes are guided in the active fiber 8. With the use of an active fiber 8 in the form of a multimode fiber, the normalized frequency V would be greater and the number M of guided modes would be correspondingly higher.

To amplify the modes in the active fiber 8, the fiber laser oscillator 12 has two pump light sources 10a, b in the form of laser diodes having a pump wavelength of 975 nm, for example, which, via respectively associated pump fibers 11a,b couple the pump radiation into the fiber cladding 9b of the active fiber 8, from which the pump radiation crosses into the fiber core 9a. The pump fibers 11a, 11b are spliced on the active fiber 8 with the aid of a pump coupler. The active fiber 8 of the fiber laser oscillator 12 has a resonator section formed between a first fiber Bragg grating 13a and a second fiber Bragg grating 13b, which are written in each case into the fiber core 9a of the active fiber 8. In the example shown, the first fiber Bragg grating 13a is configured as a highly reflective grating, that is to say, the first fiber Bragg grating 13a forms the end mirror of the fiber laser oscillator 12. The second fiber Bragg grating 13b is configured as an output coupler, e.g., as a partially transmissive grating having a typical reflectance of 2% to 10%, that is to say, at the second fiber Bragg grating 13b, the laser radiation 4 generated in the active fiber 8 is coupled out from the fiber laser oscillator 12.

Figure 2:
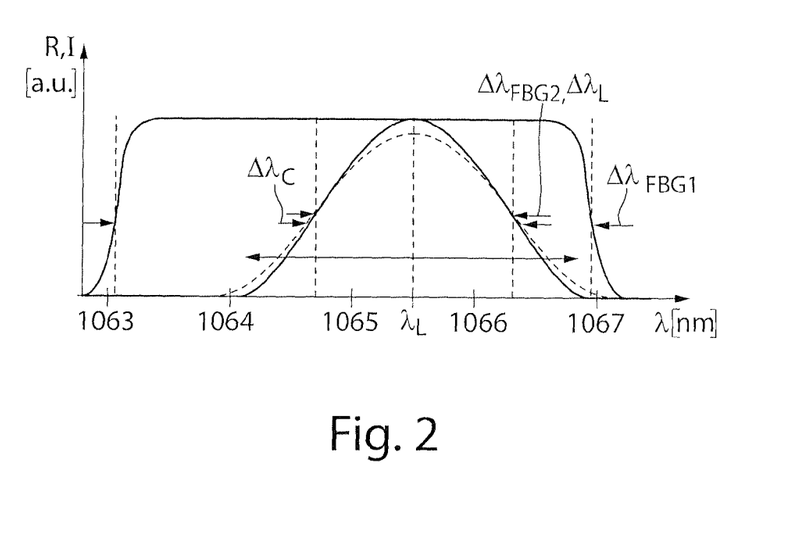
FIG. 2 is a graphical illustration of a spectral distribution of the laser radiation generated by the fiber laser arrangement from FIGS. 1A, 1B, and 1C, and of a spectral distribution of a coupling device of the fiber arrangement.

The first and second fiber Bragg gratings 13a, 13b have a wavelength dependent reflectivity R, which is illustrated in FIG. 2 (in arbitrary units). The first fiber Bragg grating 13a has a reflectivity R having a comparatively large spectral bandwidth $\Delta\lambda_{FBG1}$ of approximately 4 nm that extends over a wavelength range of between 1063 nm and 1067 nm. The second fiber Bragg grating 13b has a wavelength dependent reflectivity R which is comparatively narrowband and has a spectral bandwidth $\Delta\lambda_{FBG2}$ of approximately 1.8 nm and which, in the example shown in FIG. 2, extends over a wavelength range of between 1064.6 nm and 1066.4 nm.

The laser radiation 4 generated by the fiber laser oscillator 12 or the fiber laser arrangement 3 has a spectral bandwidth $\Delta\lambda_L$ which corresponds to the intersection of the two spectral bandwidths $\Delta\lambda_{FBG1}$, $\Delta\lambda_{FBG2}$ of the first and second fiber Bragg gratings 13a, 13b. In the example shown, in which the spectral bandwidth $\Delta\lambda_{FBG2}$ of the second fiber Bragg grating 13b lies completely within the wavelength range of the spectral bandwidth $\Delta\lambda_{FBG1}$ of the first fiber Bragg grating 13a, the spectral bandwidth $\Delta\lambda_L$ of the fiber laser arrangement 3 corresponds to the spectral bandwidth $\Delta\lambda_{FBG2}$ of the second fiber Bragg grating 13b. The fiber laser arrangement 3 or the fiber laser oscillator 12 emits laser radiation 4 whose laser wavelength $\lambda_L$ in the case of the symmetrical curve profile—shown in FIG. 2—of the reflection of the second fiber Bragg grating 13b lies in the center of the spectral bandwidth $\Delta\lambda_{FBG2}$ thereof, e.g., at $\lambda_L=1065.5$ nm. The intensity I or the power of the laser radiation 4 generated by the fiber laser arrangement 3 has a spectral distribution having its maximum at the laser wavelength $\lambda_L$.

The spectral distribution of the reflectivity R of the second fiber Bragg grating 13b can be shifted in wavelength by means of an actuator 15. For this purpose, the actuator 15 acts on two fiber holders 16a, b, between which a section of the active fiber 8 is arranged, the second fiber Bragg grating 13b being formed in said section. In the example shown, the actuator 15 is configured to change, e.g., to increase or to decrease, a distance A between the two fiber holders 16a,b. The actuator 15, which may be configured as a piezoactuator, for example, generates a compressive or tensile stress on the active fiber 8 and compresses or expands the section of the active fiber 8 arranged between the two fiber holders 16a, 16b in the axial direction (i.e., in the fiber longitudinal direction). In this way, the period length of the second fiber Bragg grating 13b written into the fiber core 9a of the active fiber 8 changes, as a result of which the wavelength dependent reflectivity R of the second fiber Bragg grating 13b as shown in FIG. 2 is shifted spectrally, as is indicated by a double headed arrow in FIG. 2. The spectral shift of the reflectivity R or of the spectral bandwidth $\Delta\lambda_{FBG2}$ of the second fiber Bragg grating 13b along the horizontal axis in FIG. 2 results in a corresponding shift of the spectral distribution of the laser radiation 4 coupled out from the fiber laser arrangement 3, that is to say, the laser wavelength $\lambda_L$ of the laser radiation 4 can be tuned with the aid of the actuator 15.

In the example shown, the actuator 15 is configured to shift the laser wavelength $\lambda_L$ between approximately 1064.5 nm and approximately 1066.5 nm. Larger shifts of the laser wavelength $\lambda_L$ are also possible if the actuator 15 is dimensioned suitably. As an alternative to an axial compression or expansion, the active fiber 8 can be bent in the section between the two fiber holders 16a, 16b to apply a tensile and/or compressive stress to the second fiber Bragg grating 13b and to bring about a shift of the laser wavelength $\lambda_L$ of the fiber laser arrangement 3 in this way. In this case, the actuator 15 can act on the active fiber 8 in a radial direction, for example, in the section between the two fiber holders 16a, 16b.

The shift of the laser wavelength $\lambda_L$ of the laser radiation 4 emitted by the fiber laser arrangement 3 can be used to change or to set the beam profile 19a, 19b of the laser radiation 4 guided by the fiber arrangement 5 in the direction of the workpiece 2. For this purpose, a coupling device 17 is fitted in the fiber arrangement 5. The coupling device 17 is configured in the form of a chirped long-period grating which is written into the fiber core 9a' of a fiber adapter 18 that connects the active fiber 8 of the fiber laser arrangement 3 to the transport fiber 6. It goes without saying that, alternatively, the coupling device 17 can also be formed in the transport fiber 6, to put it more precisely in the fiber core 9a' of the transport fiber 6. The fiber adapter 18 and the transport fiber 6 of the fiber arrangement 5 are substantially constructed like the active fiber 8, just that there is no doping with an active medium in the fiber core 9a'. To facilitate the writing in the coupling device in the form of the chirped long-period grating 17, the fiber adapter 18 may have a doping with germanium.

The coupling device in the form of the chirped long-period grating 17 has a wavelength dependent reflectivity R which has a maximum in the region of approximately 1065.5 nm (>90%) and which has a spectral bandwidth $\Delta\lambda_C$ of 2 nm. That portion of the laser radiation 4 which is reflected by the chirped long-period grating 17 is coupled into the fiber cladding 9b of the fiber adapter 18, where no reversal of direction takes place at the chirped long-period grating 17, that is to say, the reflected portion of the laser radiation 4 does not change its direction of propagation and propagates in the transport fiber 6. In contrast to the illustration shown in FIG. 2, the transmission or the decrease in the transmission of the chirped long-period grating 17 for laser radiation 4 guided in the fiber core 9a, 9a' is often represented instead of the reflectivity R. The transmission of the chirped long-period grating 17 has a spectral bandwidth $\Delta\lambda_C$ corresponding to the reflectivity R and having a minimum likewise at a wavelength of approximately 1065.5 nm. As can be discerned in FIG. 2, the spectral distribution or the spectral bandwidth $\Delta\lambda_L$ of the laser radiation 4 generated by the fiber laser arrangement 3 lies within the spectral bandwidth $\Delta\lambda_C$ of the chirped long-period grating 17.

In the case of the spectral position of the laser wavelength $\lambda_L$ or the spectral bandwidth $\Delta\lambda_{FBG2}$ of the fiber laser 3 as shown in FIG. 2, therefore, the laser radiation 4 emerging from the fiber laser arrangement 3, at the coupling device 17 in the form of the chirped fiber Bragg grating, is practically completely coupled from the fiber core 9a' into the fiber cladding 9b of the fiber adapter 18. In this way, the beam profile of the laser radiation 4 is changed, specifically from a first, Gaussian beam profile 19a of the laser radiation 4 guided in the fiber core 9a or 9a' into a second, different beam profile 19b of the laser radiation 4 guided in the fiber cladding 9b.

By shifting the spectral distribution of the reflectivity R of the second fiber Bragg grating 13b and thus the laser wavelength $\lambda_L$ of the fiber laser arrangement 3 relative to the spectral bandwidth $\Delta\lambda_C$ (not able to be shifted) of the reflectivity R of the coupling device 17, it is possible to change or set that portion of the laser radiation 4 which is coupled from the fiber core 9a' into the fiber cladding 9b. In particular, the spectral bandwidth $\Delta\lambda_L$ of the laser radiation 4 generated by the fiber laser arrangement 3 can be spectrally shifted to an extent such that it no longer overlaps the spectral bandwidth $\Delta\lambda_C$ of the coupling device 17. In this case, laser radiation 4 is practically no longer coupled into the fiber cladding 9b, such that the Gaussian beam profile 19a generated in the fiber core 9a of the fiber laser 3 is not changed in the fiber arrangement 5. To ensure that in the case of such a shift of the laser wavelength $\lambda_L$ of the fiber laser arrangement 3 laser radiation 4 continues to be generated, the spectral bandwidth $\Delta\lambda_{FBG1}$ of the first fiber Bragg grating 13a should have a magnitude at least 1.5 times, preferably at least twice, that of the spectral bandwidth $\Delta\lambda_{FBG2}$ of the second fiber Bragg grating 13b, that is to say, $\Delta\lambda_{FBG1} > 1.5\, \Delta\lambda_{FBG2}$ or $\Delta\lambda_{FBG1} > 2\, \Delta\lambda_{FBG2}$ can hold true.

Switching between the first beam profile 19a from the fiber core 9a' and the second beam profile 19b from the fiber cladding 9b makes it possible to optimize the processing (e.g., cutting or welding) of the workpiece 2. By way of example, the first beam profile 19a can be set for the cutting of thin plate shaped workpieces 2 (e.g., metal sheets), while the second beam profile 19b can be chosen for the cutting of thicker workpieces 2. It goes without saying that it is also possible to set beam profiles whose radial intensity distribution lies between the two beam profiles 19a, 19b, by suitably setting the proportion of the laser radiation 4 coupled into the fiber cladding 9b by means of the actuator 15. The setting of a beam profile 19a, 19b that is suitable or optimized for the processing can be carried out with the aid of a control device which drives the actuator 15 and which may be, for example, a part of the laser processing machine described further above.

The optical arrangement 1 shown in FIG. 1B differs from the optical arrangement 1 shown in FIG. 1A merely in that a fiber amplifier 20 is formed in addition to the fiber laser oscillator 12 on the active fiber 8, into which fiber amplifier, from further pump light sources 21a, 21b, e.g., in the form of fiber coupled diode lasers via corresponding pump fibers 22a, b, additional pump radiation is coupled into the fiber cladding 9b of the active fiber 8 to increase the power of the laser radiation 4 guided in the fiber core 9a. The fiber laser resonator 12 forms a seed laser (oscillator), which together with the fiber amplifier 20 forms a master oscillator power amplifier (MOPA) (also called master oscillator fiber amplifier (MOFA)). As an alternative to the example shown in FIG. 1B, in which only one fiber amplifier 20 is arranged in the fiber laser arrangement 3, it is also possible for a plurality of fiber amplifiers 20 to be connected in series in the fiber laser arrangement 3.

As in FIG. 1A, the laser wavelength $\lambda_L$ of the fiber laser arrangement 3 is set by means of the second fiber Bragg grating 13b being acted on with the aid of the actuator 15. It goes without saying that, in the case of the optical arrangements 1 shown in FIG. 1A and FIG. 1B, the magnitudes of the spectral bandwidths $\Delta\lambda_{FBG1}, \Delta\lambda_{FBG2}$ of the two fiber Bragg gratings 13a, 13b as shown in FIG. 2 can also be interchanged, that is to say, the spectral bandwidth $\Delta\lambda_{FBG1}$ of the first, highly reflective fiber Bragg grating 13a can be smaller than the spectral bandwidth $\Delta\lambda_{FBG2}$ of the second fiber Bragg grating 13b. In this case, the actuator 15 acts on the first fiber Bragg grating 13a to shift the wavelength of the fiber laser arrangement 3.

The fiber laser arrangement 3 shown in FIG. 1C has a fiber amplifier 20 like the fiber laser arrangement 3 shown in FIG. 1B. In contrast to FIG. 1A and FIG. 1B, however, the fiber laser arrangement 3 from FIG. 1C has a resonator 12 in which a laser rod 8' (doped crystal) is arranged as laser active medium. The rod laser resonator 12 as shown in FIG. 1C has a highly reflective mirror 14a and a grating 24 as output coupler. The laser radiation 4 generated in the resonator 12 propagates in free space downstream of the resonator 12 and is coupled into the fiber amplifier 20 via an optical element, in the example shown via a focusing lens 23, said fiber amplifier being directly fiber-to-fiber coupled to the fiber arrangement 5 as in the examples shown in FIG. 1A and FIG. 1B.

In the example shown in FIG. 1C, the setting of the wavelength $\lambda_L$ of the laser radiation 4 generated by the resonator 12 is effected with the aid of a blazed grating 24, the orientation of which relative to the impinging laser radiation 4 can be changed (rotated in the example shown) by means of an actuator 25 indicated by a double-headed arrow. Given a suitable design of the blazed grating 24, the wavelength $\lambda_L$ of the laser radiation 4 can be spectrally shifted in an interval similar to that in the case of the fiber laser resonator (oscillator) 12 described further above in association with FIG. 1A and FIG. 1B.

Instead of a resonator 12 in the form of a rod laser, alternatively it is also possible to provide a diode laser or a disk laser as seed laser in the fiber laser arrangement 3, where the laser wavelength $\lambda_L$ can be shifted with the aid of suitable devices, e.g., in the form of gratings. It is also possible to use a resonator 12 which is configured as in FIG. 1C and in which, instead of the laser rod 8', an active fiber, e.g., a fiber doped with rare earths, serves as laser-active medium. In this case, the resonator 12 is configured as a fiber laser oscillator 12 as in the examples in FIG. 1A and FIG. 1B to the setting of the laser wavelength $\lambda_L$, however, is not effected via a fiber Bragg grating 13a, 13b, but rather by means of the blazed grating 24 in free space propagation. In this case, a further optical element is typically arranged between the active fiber and the blazed grating 24 to collimate the laser radiation 4 emerging from the active fiber before it impinges on the blazed grating 24.

What is important in the case of all the fiber laser arrangements 3 shown in FIG. 1A, FIG. 1B and FIG. 1C is that they are directly coupled to the fiber arrangement 5 at their exit end, e.g., at the end at which the laser radiation 4 has its maximum power.

Figure 3:
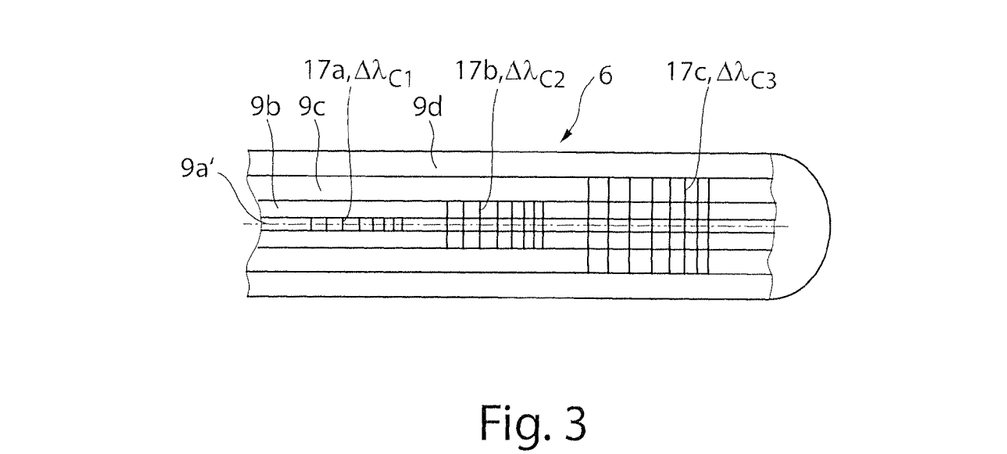
FIG. 3 shows an illustration of a transport fiber in a form of a multiple cladding fiber with a plurality of chirped long-period gratings.

In FIG. 1A, FIG. 1B and FIG. 1C, a fiber arrangement 5 having a fiber core 9a' and just a single fiber cladding 9b is used. It goes without saying however, that it is also possible to use fiber adapters 18 and/or transport fibers 6 which have more than one fiber cladding. FIG. 3 shows a transport fiber 6 having a fiber core 9a' and three fiber claddings 9b-d surrounding the fiber core 9a' in a ring-shaped fashion, in each of which fiber claddings laser radiation 4 can be guided. In the example shown there are fitted in the transport fiber 6 three coupling devices 17a-c in the form of chirped long-period gratings, the first of which couples a portion— dependent on the laser wavelength $\lambda_L$—of the laser radiation 4 from the fiber core 9a' into the first fiber cladding 9b, situated radially furthest on the inside. The second and third coupling devices 17b and 17c, respectively, correspondingly couple a portion—dependent on the laser wavelength $\lambda_L$—of the laser radiation 4 guided in the fiber core 9a' into the second fiber cladding 9c and into the third fiber cladding 9d, respectively. The fixedly predetermined spectral bandwidths $\Delta\lambda_{C1}$, $\Delta\lambda_{C2}$, $\Delta\lambda_{C3}$ of the three coupling devices 17a-c in the form of the chirped long-period gratings are typically chosen such that they do not overlap spectrally. What can be achieved in this way is that, given a suitably set laser wavelength $\lambda_L$, the laser radiation 4 is coupled only into one of the three fiber claddings 9b-d. In the example shown in FIG. 3, the active fiber 8 may likewise have more than one fiber cladding, but this is not absolutely necessary. By means of the transport fiber 6 shown in FIG. 3, different focus diameters can be generated on the workpiece 2 using one and the same focusing device 7, which may be configured as a zoom optical unit, if appropriate. It goes without saying that, in contrast to the illustration shown in FIG. 3, the coupling devices 17 a-c can also be fitted in a fiber adapter 18 of the fiber arrangement 5, which fiber adapter is formed between the fiber laser arrangement 3 and the transport fiber 6 or, if appropriate, is adjacent to the exit end of the transport fiber 6. Such a fiber adapter 18 typically has geometrical parameters identical to those of the transport fiber 6 and it is generally configured as a photosensitive fiber (doped with germanium) to facilitate the writing in of the gratings.

Different types of fibers 8, 18, 6 than those described above can also be used in the optical arrangement 1. To generate a high power of the laser radiation 4, e.g., more than 500 W or 1000 W, a plurality of modes to propagate in the active fiber 8 of the fiber laser 3 can be used, that is to say, the use of a single-mode fiber in the fiber laser arrangement 3 may be not desired.

To summarize, in the manner described above, laser radiation 4 can be coupled from the fiber core 9a, 9a' into at least one fiber cladding 9b-d, without having to leave the fibers 8, 18, 6 for this purpose, that is to say, the fully monolithic, both optically and mechanically robust and compactly realizable construction of the combination of fiber laser arrangement 3 and fiber arrangement 5 is maintained.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:
1. An optical arrangement for processing a workpiece, comprising:
 a fiber laser arrangement configured to emit laser radiation;
 a fiber arrangement directly coupled to the fiber laser arrangement and configured to guide the laser radiation from the fiber laser arrangement to the workpiece to be processed, wherein the fiber arrangement comprises a transport fiber having a fiber core and one or more fiber claddings surrounding the fiber core; and
 at least one coupling device configured to couple a portion of the laser radiation guided in the fiber arrangement into at least one fiber cladding of the transport fiber,
 wherein a spectral bandwidth of the coupling device has at least the same magnitude as a spectral bandwidth of the laser radiation emitted by the fiber laser arrangement,
 wherein the fiber laser arrangement comprises a resonator having an active fiber, and the resonator is formed between a first fiber Bragg grating and a second fiber Bragg grating, and wherein a spectral bandwidth of a reflectivity of the second fiber Bragg grating is smaller than and within a spectral bandwidth of a reflectivity of the first fiber Bragg grating, such that the spectral bandwidth of the laser radiation of the fiber laser arrangement corresponds to the spectral bandwidth of the reflectivity of the second fiber Bragg grating,
 wherein the fiber laser arrangement is configured to change a beam profile of the laser radiation guided in the direction of the workpiece to be processed by shifting the spectral bandwidth of the laser radiation of the fiber laser arrangement relative to the spectral bandwidth of the coupling device and thereby changing the portion of the laser radiation that is coupled into the at least one fiber cladding of the transport fiber, and
 wherein the fiber laser arrangement is configured to shift the spectral bandwidth of the laser radiation of the fiber laser arrangement relative to the spectral bandwidth of the coupling device by spectrally shifting the spectral bandwidth of the reflectivity of the second fiber Bragg grating relative to the spectral bandwidth of the reflectivity of the first fiber Bragg grating.
2. The optical arrangement of claim 1, wherein the coupling device is configured to be a chirped long-period grating.

3. The optical arrangement of claim 2, wherein the chirped long-period grating has a spectral bandwidth of at least 0.3 nm.

4. The optical arrangement of claim 1, wherein the fiber laser arrangement is configured to generate laser radiation having a spectral bandwidth of at least 0.1 nm.

5. The optical arrangement of claim 1, wherein the spectral bandwidth of the reflectivity of the first fiber Bragg grating has a magnitude at least 1.5 times that of the spectral bandwidth of the reflectivity of the second fiber Bragg grating.

6. The optical arrangement of claim 1, further comprising:
an actuator configured to act on the second fiber Bragg grating for spectrally shifting the bandwidth of the reflectivity of the second fiber Bragg grating relative to the spectral bandwidth of the reflectivity of the first fiber Bragg grating.

7. The optical arrangement of claim 6, wherein the actuator is configured to generate at least one of a tensile stress or a compressive stress on the second fiber Bragg grating.

8. The optical arrangement of claim 1, wherein the fiber laser arrangement comprises one or more fiber amplifiers for amplifying the laser radiation generated in a resonator.

9. The optical arrangement of claim 1, wherein the fiber laser arrangement comprises an active fiber comprising a multimode fiber or a large mode area fiber.

10. The optical arrangement of claim 1, wherein the fiber arrangement comprises:
a plurality of coupling devices each configured to couple the laser radiation from the fiber core into a respective one of the fiber claddings.

11. The optical arrangement of claim 10, wherein there is no spectral overlap among spectral bandwidths of the coupling devices.

12. The optical arrangement of claim 1, wherein the fiber laser arrangement is configured to couple a larger portion of the laser radiation into the at least one fiber cladding of the transport fiber when processing a thick workpiece than when processing a thin workpiece.

13. A method of processing a workpiece by an optical arrangement, the method comprising:
guiding a laser radiation generated from a laser arrangement in a direction to the workpiece to be processed by a fiber arrangement directly coupled to the laser arrangement, wherein the fiber arrangement comprises a transport fiber having a fiber core and one or more fiber claddings surrounding the fiber core;
coupling, by at least one coupling device, a portion of the laser radiation guided in the fiber arrangement into at least one fiber cladding of the transport fiber; and
changing a beam profile of the laser radiation guided in the direction of the workpiece to be processed by shifting a spectral bandwidth of the laser radiation of the fiber laser arrangement relative to a spectral bandwidth of the coupling device and thereby changing the portion of the laser radiation that is coupled into the at least one fiber cladding of the transport fiber, wherein the spectral bandwidth of the coupling device has at least the same magnitude as the spectral bandwidth of the laser radiation,
wherein the laser arrangement comprises a resonator formed between a first fiber Bragg grating and a second fiber Bragg grating, and wherein a spectral bandwidth of a reflectivity of the second fiber Bragg grating is smaller than and within a spectral bandwidth of a reflectivity of the first fiber Bragg grating, such that the spectral bandwidth of the laser radiation of the fiber laser arrangement corresponds to the spectral bandwidth of the reflectivity of the second fiber Bragg grating, and
wherein shifting the spectral bandwidth of the laser radiation relative to the spectral bandwidth of the coupling device comprises:
spectrally shifting the spectral bandwidth of the reflectivity of the second fiber Bragg grating relative to the spectral bandwidth of the reflectivity of the first fiber Bragg grating.

14. The method of claim 13, wherein spectrally shifting the spectral bandwidth of the reflectivity of the second fiber Bragg grating relative to the spectral bandwidth of the reflectivity of the first fiber Bragg grating comprises:
generating at least one of a tensile stress or a compressive stress on the second fiber Bragg grating.

15. The method of claim 13, wherein coupling the portion of the laser radiation guided in the fiber arrangement into at least one fiber cladding of the transport fiber comprises:
coupling, by each of a plurality of coupling devices, the laser radiation from the fiber core into a respective one of the fiber claddings, wherein there is no spectral overlap among spectral bandwidths of the coupling devices.

16. The method of claim 13, further comprising amplifying the laser radiation generated in a resonator by one or more fiber amplifiers in the laser arrangement.

17. The method of claim 13, wherein the laser arrangement comprises an active fiber comprising a multimode fiber or a large mode area fiber.

18. The method of claim 13, wherein the laser arrangement comprises a resonator formed between a highly reflective mirror and a blazed grating, and
wherein shifting the spectral bandwidth of the laser radiation comprises changing an orientation of the blazed grating relative to the laser radiation.

* * * * *